United States Patent [19]

Schwarze

[11] 4,388,039
[45] Jun. 14, 1983

[54] TUBE FEEDING DEVICE

[76] Inventor: Rigobert Schwarze, Olpener Str. 460-474, 5000 Köln 91, Fed. Rep. of Germany

[21] Appl. No.: 201,323

[22] Filed: Oct. 27, 1980

[30] Foreign Application Priority Data

Oct. 30, 1979 [DE] Fed. Rep. of Germany ....... 2943769

[51] Int. Cl.³ .............................................. B65G 47/06
[52] U.S. Cl. ...................................... 414/748; 72/133; 198/593; 221/201; 221/202; 221/257; 414/900
[58] Field of Search ................. 414/97, 112, 125, 131, 414/745, 748, 900; 221/201, 202, 242, 256, 257, 266; 198/540, 542, 543; 72/133, 424

[56] References Cited

U.S. PATENT DOCUMENTS

| 399,851 | 3/1889 | Doubleday | 221/256 X |
|---|---|---|---|
| 2,998,125 | 8/1961 | Hahn et al. | 72/424 X |
| 3,360,164 | 12/1967 | Zerlaut | 221/239 |
| 3,437,234 | 4/1969 | Izen et al. | 221/266 X |
| 3,746,212 | 7/1973 | Anderheggen et al. | 198/540 |
| 3,972,407 | 8/1976 | Kushigian | 221/257 X |
| 4,300,672 | 11/1981 | Millar et al. | 414/745 X |

FOREIGN PATENT DOCUMENTS

| 964256 | 7/1964 | United Kingdom | 72/424 |
|---|---|---|---|
| 982606 | 2/1965 | United Kingdom | 414/748 |

Primary Examiner—Leslie J. Paperner
Attorney, Agent, or Firm—Michael J. Striker

[57] ABSTRACT

A tube feeding device, particularly for use in a bending machine, comprises two units spaced from one another at a predetermined distance to form a tube magazine therebetween. A carriage with a recess to receive one individual tube is positioned at the bottom of the tube magazine. A chain conveyor is provided in the device adapted to receive individual tubes from the recess and transport the tubes toward the bending machine. The carriage is adapted to move towards and away from the chain conveyor to deliver the individual tube to the conveyor which is provided with a plurality of grippers adapted to carry the tubes and to advance them in a vertical direction.

12 Claims, 5 Drawing Figures

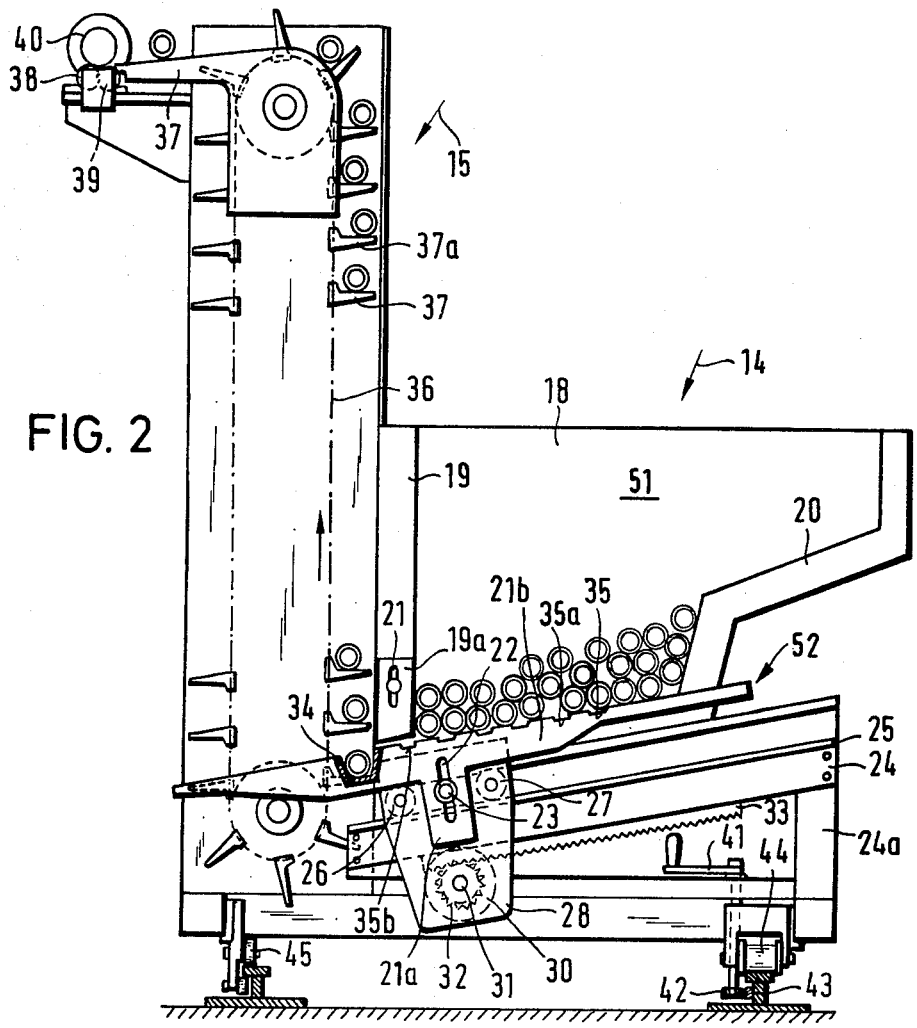

TUBE FEEDING DEVICE

BACKGROUND OF THE INVENTION

The present invention relates to a tube bending machine, and more particularly to a tube feeding device for removing a tube from a tube magazine and transporting this tube to the bending machine.

Metallic tubes to be bent in tube bending machines are delivered to the bending machine from a magazine from which one individual tube is removed and transported to the bending machine in a direction transverse to the elongation of the tube. In the known devices, in order to provide the transportation of the tubes to be treated in the bending machine, a chute having relatively strong inclination is utilized to receive tubes from the magazine, in which chute tubes are positioned one after another. In this known device it was necessary to preliminarily separate an individual tube from a stock and then to feed the tubes to the chute. Since the tubes in the magazine were positioned in a stack each individual tube should have been separated from the stock by hand which was time consuming. The removing of a relatively large tube by hand was found physically exhausting for an operator.

In practice where rational manufacturing of tubes is required, a mechanical removal of individual tubes from the tube magazine is absolutely necessary. It has been observed that individual tubes stored in a stack in the tube magazine may be easily stuck to each other and thereby form the so-called bridge when the tubes are superposed one another. Under such conditions, it is rather difficult to separate an individual tube from the stock and remove it from the magazine.

There are known devices, in which hydraulically or pneumatically operated sliders positioned in the bottom area of the device are utilized. These sliders move the tubes in a direction transverse to the direction of elongation of the tubes located in the magazine. One of the tubes delivered by the slider falls into a recess provided in the area adjacent the slider. In operation of the known device an axial force caused by a loading cylinder and applied to a tube positioned in the recess when the tube is removed from the recess may cause bending or deforming of tubes being removed. Under these circumstances there is a danger that tubes being processed may be deformed or stuck in the tube magazine.

SUMMARY OF THE INVENTION

It is an object of the present invention to overcome the disadvantages of the prior art.

More particularly, it is an object of the present invention to provide an improved tube feed device where the danger of sticking tubes in a stock in a tube magazine during removing of an individual tube from the stock is avoided by means of the invention.

Still another object of the invention is to provide a construction of maximum simplicity, efficiency and ease of operation.

These and other objects of the invention are attained by a tube feeding device, particularly for a bending machine, comprising a tube magazine where tubes are positioned in a stock; said magazine having a bottom portion; means for receiving tubes from said tube magazine; and means for removing tubes from said tube magazine positioned in said bottom portion and including a recess to receive an individual tube, said recess extending in the direction of elongation of the tubes located in said tube magazine, said tube removing means being adapted to move towards and away from said tube receiving means in a direction transverse to said direction of elongation of the tubes.

The tube receiving means may be located outside said tube magazine.

The tube receiving means and the tube removing means form two identical units spaced from one another at a distance corresponding to the length of the tubes to be treated; each of said units has an inner lateral wall facing the inner lateral wall of another unit so that said tube magazine is bounded by said inner lateral walls facing each other.

Each of the units may comprise carriage means including an elongated element, said recess being formed in said elongated element.

The elongated element may have an upper surface arranged to contact tubes located in the tube magazine, said upper surface being formed with a plurality of grooves spaced from one another and extending in the direction of elongation of the tubes.

These grooves are provided to permit tubes in the magazine to be lifted and lowered relative to said upper surface of the elongated element so that the formation of the so-called bridge which may occur in a stock of tubes is completely prevented.

This lifting and lowering movement of tubes in the magazine may be attained by means of vibrators to thereby further ensure that a tube falls into the recess provided in the elongated element during the movement thereof towards and away from the tube receiving means.

The device may further include guide rails, said units being arranged to move along said guide rails so as to adjust the distance between the units for a predetermined length of the tubes to be treated.

Each unit may further comprise two opposite end walls projecting between the lateral walls and forming a front bearing surface and a rear bearing surface for tubes located in said tube magazine.

The carriage means may further include an electromotor and a drive gear operatively connected thereto, each of the inner lateral walls being provided with a rack, said drive gear being adapted to cooperate with the respective rack to thereby move the elongated element towards and away from said tube receiving means.

The carriage means may further include a pair of wheels mounted on the elongated element and guide bearing means formed on said lateral wall, said wheels being adapted to slide along said guide bearing means when said drive gear moves with respect to said rack.

Each of said units may further include conveying means cooperated with the carriage means and adapted to receive an end of an individual tube from said recess.

The conveying means may include a chain conveyor extending in a vertical plane.

The chain conveyor may include a plurality of grippers positioned one after another and adapted to grip the ends of the tubes received from the recess.

The chain conveyor may be adapted to move in stepwise fashion.

The carriage means may be located in the region of movement of the chain conveyor.

The chain conveyor may be so arranged that when some of said grippers which are free of tubes reach a position where tubes are transferred from the chain conveyor for further processing, the unloaded grippers pass said position unless the next tube-carrying gripper arrives at said position.

The device may further comprise means for delivering tubes from said tube removing means to a position where a tube is to be further treated.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWINGS

FIG. 2 is a sectional view taken along line II—II of FIG. 1 and illustrating tube removing means and tube receiving means in the position where the tube removing means are moved toward the tube receiving means;

FIG. 3 is a partial sectional view taken along line II—II of FIG. 1 and showing tube removing means and tube receiving means in the position where the tube removing means are remote from the tube receiving means;

DETAILED DESCRIPTION OF THE PREFERRED EMBODIMENTS

Figure 1:
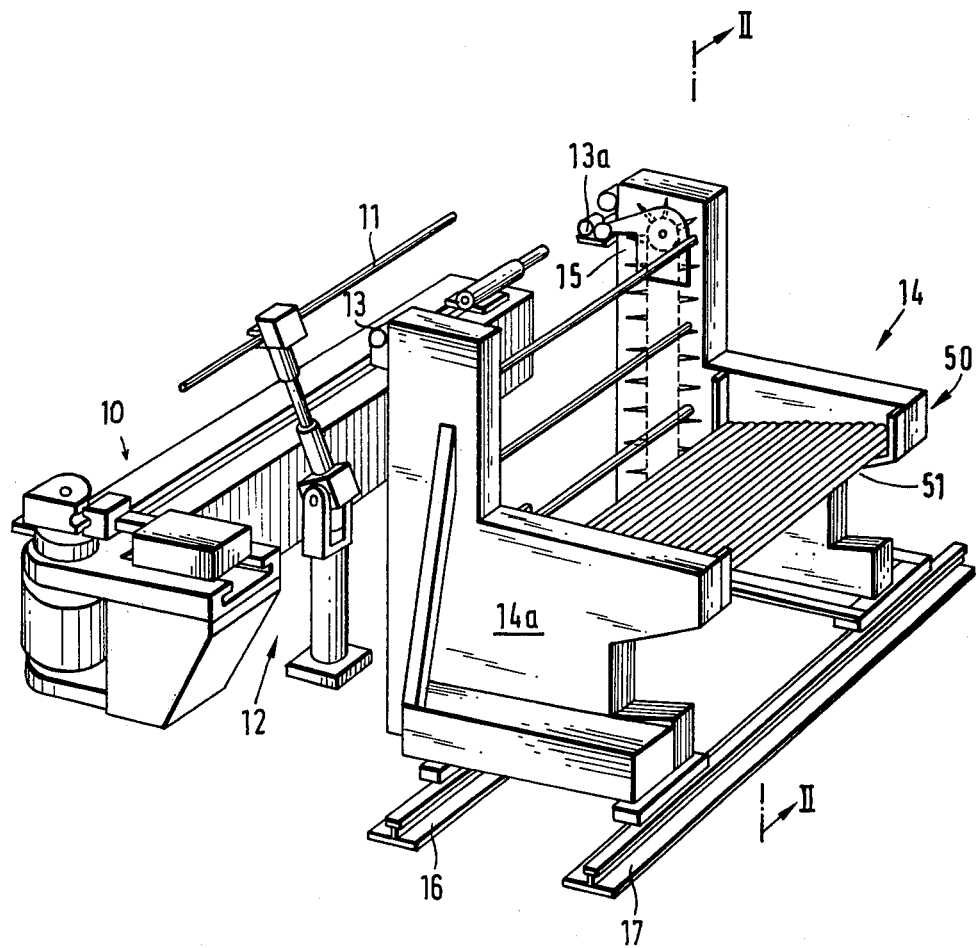
FIG. 1 is a perspective view of a bending machine with a tube feed device according to the invention.
Figure 4:
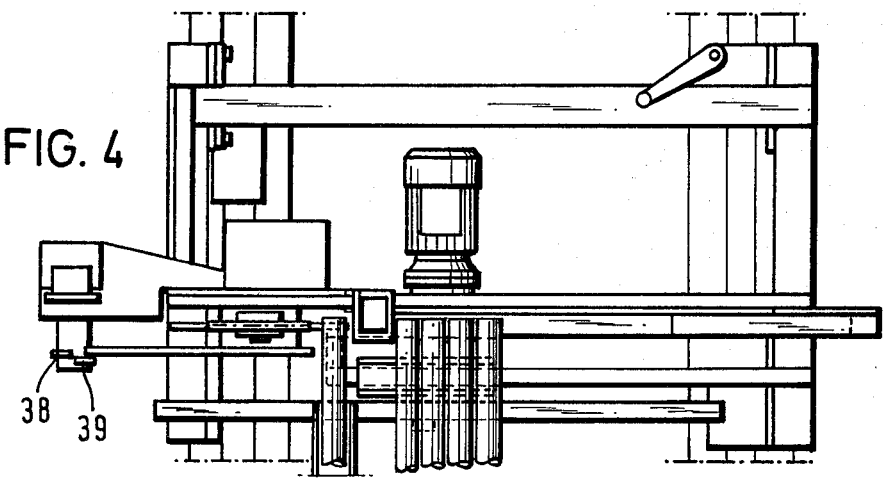
FIG. 4 is a partial top plan view of the device shown in FIG. 2.

Referring now to the drawings and more particularly to FIG. 1 of the same, it will be seen that a tube bending machine generally designated by 10 is loaded by an arrangement 12 for loading the tube bending machine which takes an individual tube 11 from supports 13, 13a as provided on units 14, 14a of the tube feed device denoted as 50. The supports 13, 13a are arranged so that the arrangement 12 covers a distance somewhat about 90° in its path in a vertical plane. The arrangement 12 is described in the applicant's German patent application No. 28 32 980.

FIGS. 2 and 3 illustrate a part of the tube feed device in two different positions. A chain conveyor 15 is located on a vertically extending portion of the respective unit.

It is to be understood that two identical units for removing tubes from a tube magazine 51 located between these two units spaced from one another are provided in the device of the invention. Each of the units includes the chain conveyor 15 and carriage means generally denoted as 52 and located in the respective unit 14 or 14a. For the sake of convenience only one unit for removing tubes from the tube magazine is illustrated in the drawing and will be described in detail below. The units 14 and 14a are movable on guide rails 16 and 17 spaced from one another. The units 14 and 14a may be adjusted relative to one another at a predetermined distance so that tubes of various length may be positioned between two units 14 and 14a.

The tube magazine 51 is formed between lateral inner walls 18 of the units 14 and 14a. The tube magazine is bounded by a front bearing wall 19 at the front end of the wall 18 and by a rear bearing wall 20 at the rear end of the wall 18. These bearing surfaces form in the region of the ends of tubes to be treated a front wall and a rear wall of the magazine. A wall section 19a is provided on the front wall 19 which section is adjustable at its height by means of an elongated hole 21 formed in this section and a bolt 19a extending through this hole.

Figure 5:
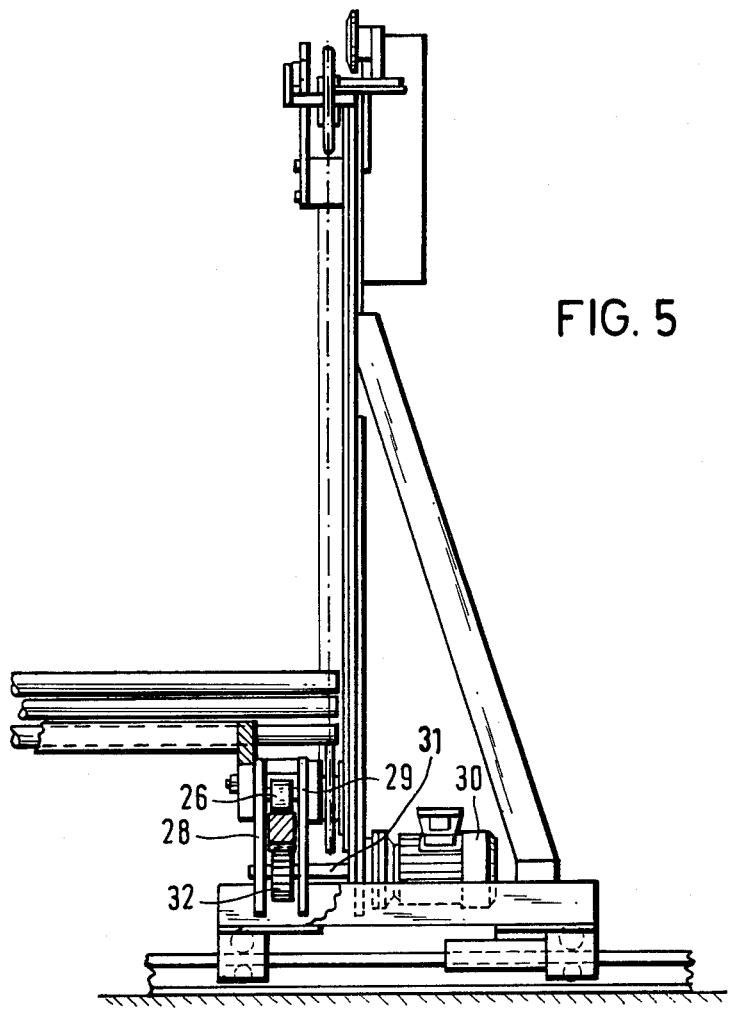
FIG. 5 is a partial elevational view of the tube feed device shown in FIG. 2.

The carriage means 52 includes an elongated element 21b positioned at the bottom of the unit 14. A downwardly projecting recess 21a is formed in the element 21b which is formed with a longitudinal hole 22. A bolt 23 extended through the hole 22 serves to adjust the position of the element in a vertical direction. A support 24a is provided in the unit which includes a guide rail 24 having an upper bearing surface 25. A pair of wheels 26 and 27 are supported on the element 21b which are engaged with the bearing surface 25 for slidable movement of the carriage means with respect to support 24a. As may be seen in FIG. 5, the wheels 26 and 27 are located between respective checks or side walls 28 and 29. The wheels 26 and 27 in connection with side walls 28 and 29 form with the rod-like element 21b carriage means positioned in the unit 14. As was mentioned above, carriage means 52 provided in the unit 14a are identical to those described for the unit 14.

A drive motor 30 is mounted in the support 24a (FIG. 5) which motor has an output shaft 31 which drives a gear 32 which in turn cooperates with a rack 33 mounted on the guide rail 24. FIGS. 2 and 3 each shows a position of carriage means in which the element 21b is moved toward the conveyor 15 or from the latter by the drive motor 30. A recess 34 is formed in the longitudinal element 21b which serves to receive an individual tube separated from a stock of tubes. The tube to be removed from the tube magazine 51 falls into the recess 34 and thereafter is moved towards the conveyor 15. This recess extends in a direction of elongation of tubes a relative short distance so that only the ends of the tube to be removed are engaged by two recesses 34, respectively provided in the units 14, and 14a. The recess 34, in actual fact, has a dimension corresponding to the outer diameter of tubes to be treated. Usually a recess with a relatively larger cross-section is selected. In case tubes of relatively small diameter are to be treated an additional element (not shown herein) may be inserted into the recess 34, which element has a cross-section corresponding to the outer diameter of the tubes to be treated. It is important that the width and the height of the recess 34 should also correspond to a size of a tube to prevent the fact that the tube would be either protruded from the recess or be positioned below the upper edge of the recess. Only one tube from the stock falls into the recess 34 during the movement of the carriage means 52. It is difficult to foresee when a tube falls into the recess 34 but as soon as it happens no further tube may be inserted into this recess.

In order to prevent the formation of the so-called bridge in the tube stock the lower surface of tubes is subjected to a slight lifting movement which may be obtained by means of vibrators commonly known in the art.

To facilitate this oscillating movement, a plurality of grooves 35, 35a and 35b are formed in the upper edge of the element 21b.

The carriage means bring the recess 34 carrying the individual tube to be removed to the chain conveyor 15 which has stringers 36 provided with a number of grippers 37 and 37a which are arranged to move in stepwise fashion. The conveyor 15 transports the tubes arrived from the recess 34 one after another. The grippers 37 and 37a are slightly inclined so that they reliably support tubes in their movement in the upward direction. The tubes thereafter reach a position where the tube to be further transported is positioned on two rollers 38 and 39. The tube is then oriented by a motor 40 so as to position a welding seam of the tube in a predetermined orientation. At this oriented position a tube is taken by the arrangement 12 and transported to the bending machine 10.

The movement of the conveyor 15 continues and the carriage means with the recess 34 are moved from the region of operation of the conveyors 15 as clearly shown in FIG. 3. At this time almost each gripper 37, 37a carries a tube. If none of the tubes falls into the recess 34 during the movement of the carriage means 52 and one or more grippers are not loaded with a tube the process continues with a certain rhythm.

In the rhythm of delivering of tubes to the bending machine which depends upon the rhythm of bending of tubes, only one tube should be always available for further processing which is positioned on the bearing rollers 38 and 39. To achieve this, the conveyor 15 should be arranged so that it should have two stops if one gripper is not loaded with a tube. In case two grippers positioned one after another are not loaded with tubes three stops of the conveyor 15 must be provided so that in each case an individual tube is available at the position to be delivered to the bending machine after the previous tube has been removed by the arrangement 12.

Both walls of the units 14 and 14a and the position of the chain conveyors 15 are adjusted so as to correspond to a predetermined length of the tubes to be treated in the bending machine. Each unit is provided with a handle 41 mounted on the support 24a of the wall 18, which handle drives a gear 42 which in turn cooperates with a rack 43 positioned on the guide rail 17. At the same time the units 14 and 14a run on respective wheels 44, 45 as may be clearly seen in FIGS. 2 and 3.

It will be understood that each of the elements described above, or two or more together, may also find a useful application in other types of tube feeding device differing from the types described above.

While the invention has been illustrated and described as embodied in a tube feeding device, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A tube feeding device, particularly for a bending machine, comprising a tube magazine where tubes are positioned in a stock side by side and upon each other, said magazine having a bottom portion; means for receiving tubes from said tube magazine; means for removing tubes from said tube magazine positioned in said bottom portion and including a recess to receive an individual tube, said recess extending in the direction of elongation of the tubes located in said tube magazine, carriage means positioned in said bottom portion and provided with at least one drive motor adapted to move the carriage means towards and away from said tube receiving means in a direction transverse to said direction of elongation of the tubes, said tube receiving means being located outside said tube magazine, said tube receiving means and said tube removing means being two units forming mirrow images of each other and being spaced from one another at a distance corresponding to the length of the tubes to be treated, each of said units having an inner lateral wall facing the inner lateral wall of another unit, each unit further comprising two opposite end walls projecting between said inner lateral walls and forming a front bearing surface and a rear bearing surface for the tubes located in said tube magazine; and guide rails, said units having wheels being arranged to move on said guide rails, each unit being provided with a handle, which drives a gear which in turn cooperates with a rack positioned on one of the guide rails so as to adjust said distance for a predetermined length of the tubes to be treated.

2. A device of claim 1, wherein each of said units comprises the carriage means including an elongated element, said recess being formed in said elongated element.

3. The device of claim 1, said carriage means further including a drive gear operatively connected to said drive motor, each of said inner lateral walls being provided with a rack, said drive gear being adapted to cooperate with the respective rack to thereby move said carriage means towards and away from said tube receiving means.

4. The device of claim 3, wherein said carriage means further include a pair of wheels mounted on said elongated element and guide bearing means formed on the respective lateral wall, said wheels being adapted to slide along said guide bearing means when said drive gear moves with respect to said rack.

5. The device of claim 4, wherein each of said units further includes conveying means cooperating with said carriage means and adapted to receive an end of an individual tube from said recess.

6. The device of claim 5, wherein said conveying means include a chain conveyor extending in an upright plane.

7. The device of claim 6, wherein said chain conveyor includes a plurality of grippers positioned one after another and adapted to grip the ends of the tubes received from said recess.

8. The device of claim 7, wherein said chain conveyor is adapted to move in stepwise fashion.

9. The device of claim 8, wherein said carriage means are located in the region of movement of said chain conveyor.

10. The device of claim 1, further comprising means for delivery tubes from said tube removing means to a position where a tube is to be further treated.

11. The device of claim 1, wherein said carriage means has an upper surface arranged to contact the tubes located in said tube magazine, said upper surface being formed with a plurality of grooves spaced from one another and extending in said direction of elongation of the tubes.

12. A tube feeding device, particularly for a bending machine, comprising a tube magazine where tubes are positioned in a stock side by side and upon each other, said magazine having a bottom portion and including a recess to receive an individual tube; means for receiving tubes from said tube magazine located outside said tube magazine; means for removing tubes from said tube magazine positioned in said bottom portion, said tube receiving means and said tube removing means being two units forming mirrow images of each other and being spaced from one another at a distance corresponding to the length of the tubes to be treated, each of said units having an inner lateral wall facing the inner lateral wall of another unit so that said tube magazine is bounded by said inner lateral walls facing each other, each of said units comprising carriage means including an elongated element formed with said recess, said recess extending in the direction of elongation of the tubes located in said magazine, said elongated element having an upper surface arranged to contact the tubes located in said tube magazine, said upper surface being formed with a plurality of grooves spaced from one another and extending in said direction of elongation of the tubes; and guide rails, said units being arranged to move along said guide rails so as to adjust said distance for a predetermined length of the tubes to be treated, each unit further including two opposite end walls projecting between said inner lateral walls and forming a front bearing surface and a rear bearing surface for the tubes located in said tube magazine, said carriage means further including an electromotor and a drive gear operatively connected thereto, each of said inner lateral walls being provided with a rack, said drive gear being adapted to cooperate with the respective rack to thereby move said elongated element towards and away from said tube receiving means in a direction transverse to the direction of elongation of the tubes.

* * * * *